April 21, 1931. A. F. PAUL 1,801,973
STEP AND TRAP CONSTRUCTION FOR PASSENGER CARS
Filed Nov. 8, 1929 4 Sheets-Sheet 1

Inventor
Abram Frank Paul
By his Attorneys
Darby & Darby

April 21, 1931.  A. F. PAUL  1,801,973
STEP AND TRAP CONSTRUCTION FOR PASSENGER CARS
Filed Nov. 8, 1929  4 Sheets-Sheet 2
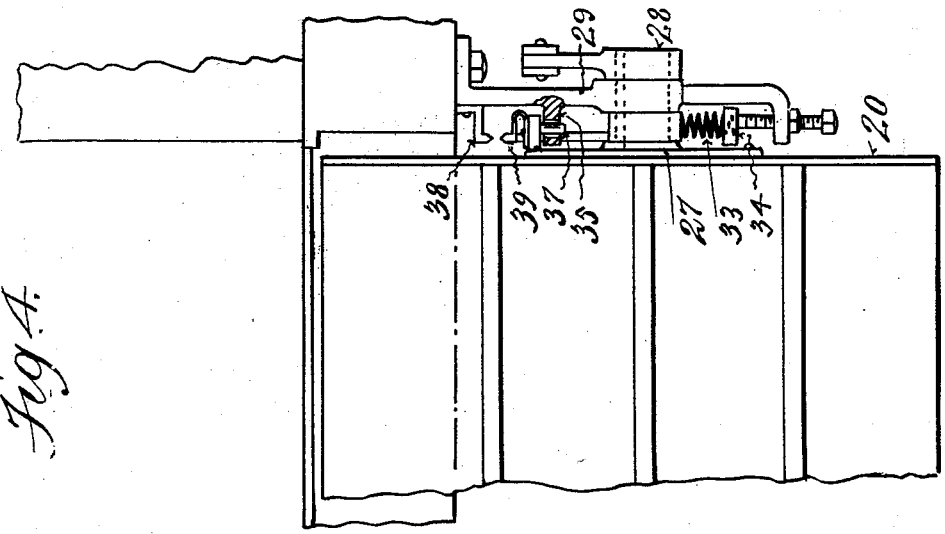
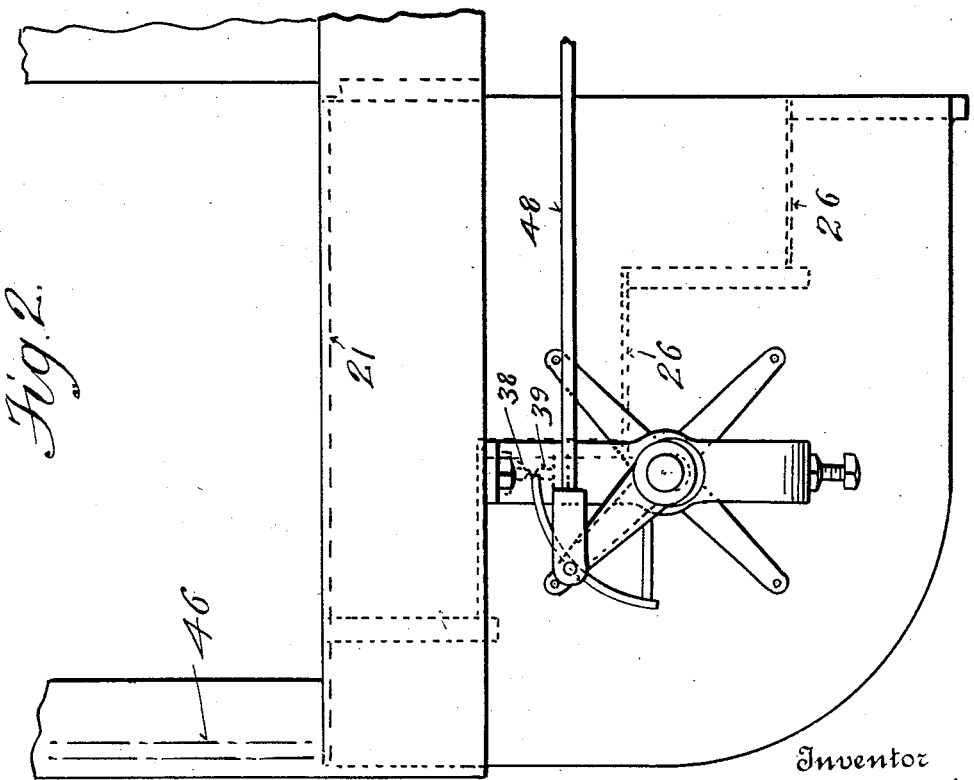

Abram Frank Paul
By his Attorneys
Darby & Darby

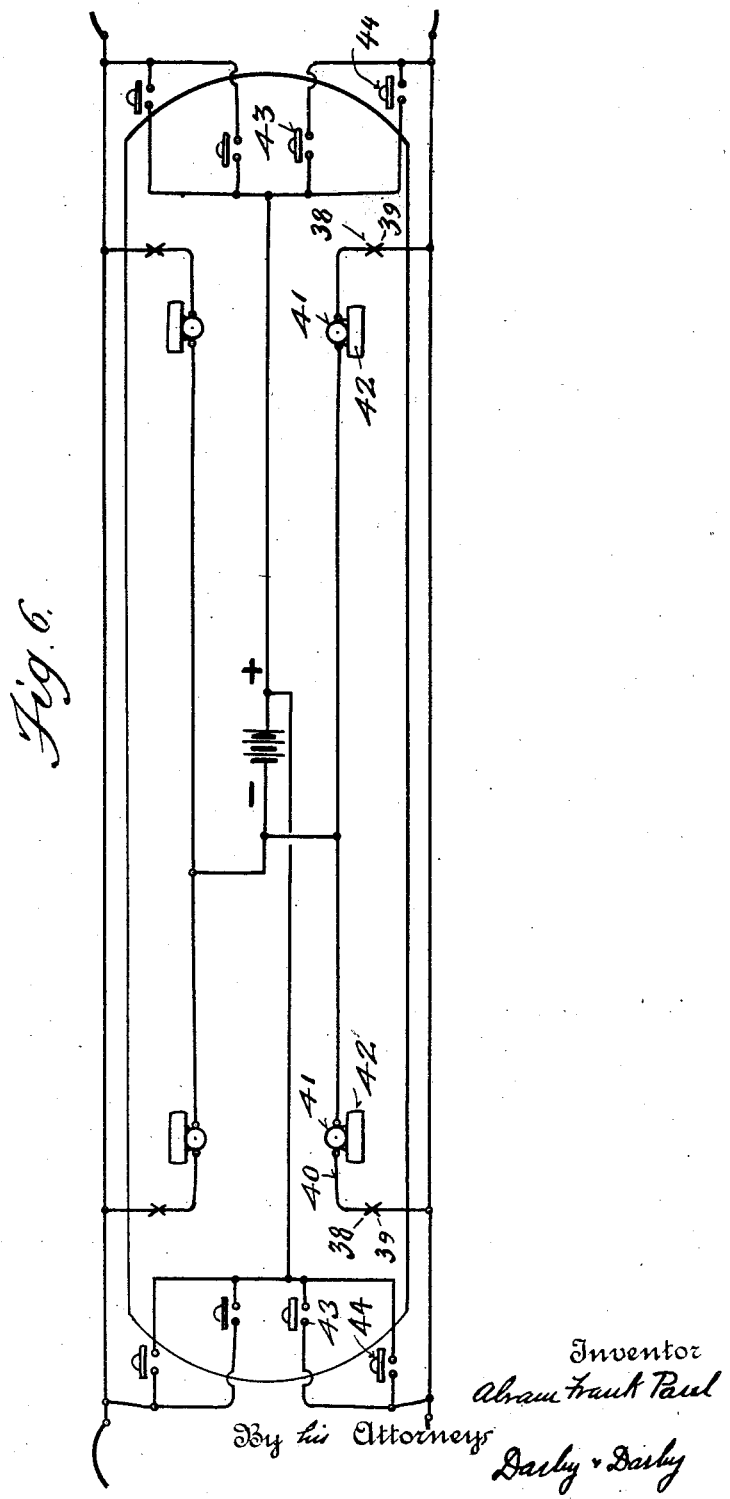

Patented Apr. 21, 1931

1,801,973

UNITED STATES PATENT OFFICE

ABRAM FRANK PAUL, OF LLANERCH, PENNSYLVANIA, ASSIGNOR TO NATIONAL PNEUMATIC COMPANY, OF NEW YORK, N. Y., A CORPORATION OF WEST VIRGINIA

STEP AND TRAP CONSTRUCTION FOR PASSENGER CARS

Application filed November 8, 1929. Serial No. 405,795.

This invention relates to a combined step and trap device for use in passenger cars and has for its object the provision of a simple and efficient step and trap construction in which the step or stairway structure is used to form the trap by rotating the stairway about a given point so that in one position it forms the trap and makes a continuous platform from the vestibule high lever platforms or the stair steps are used for low level platforms. In the former position passengers are enabled to step from the car floor into high level platforms which are approximately level with the car floor and in the latter passengers alight on or enter from low level platforms.

Another object is the provision of a safety interlocking device by which the stairway structure is locked in stairway position by a passenger stepping on the stairs, thus preventing rotation of the mechanism while a passenger is going in or out of the train.

A further object of my invention consists in the provision of a gate or bar arranged in the car vestibule in such a manner as to prevent passengers from stepping on the trap before the unit has been properly positioned for high or low level platforms.

Another advantage of my construction resides in the arrangement by which the stairs are kept free from snow or foreign matter by reason of the position of the stairway steps when in trap position.

A still further object includes the provision of means for remotely controlling said stairway and trap.

Other objects will appear hereinafter and I attain these objects by the construction illustrated in the accompanying drawings in which Figure 1 is an end view of a stairway construction attached to the car frame in stairway forming position;

Fig. 2 is a view showing the stairway structure in trap door position for letting passengers in from, or off onto high level platforms;

Fig. 4 is a partial view similar to the construction shown in Fig. 3 but showing the stairway in inter-locked position;

Fig. 6 is a more or less diagrammatic showing of the car with the wiring and mechanism for remotely controlling the stairway and trap.

Like numerals refer to similar parts throughout the several views.

Figure 1:
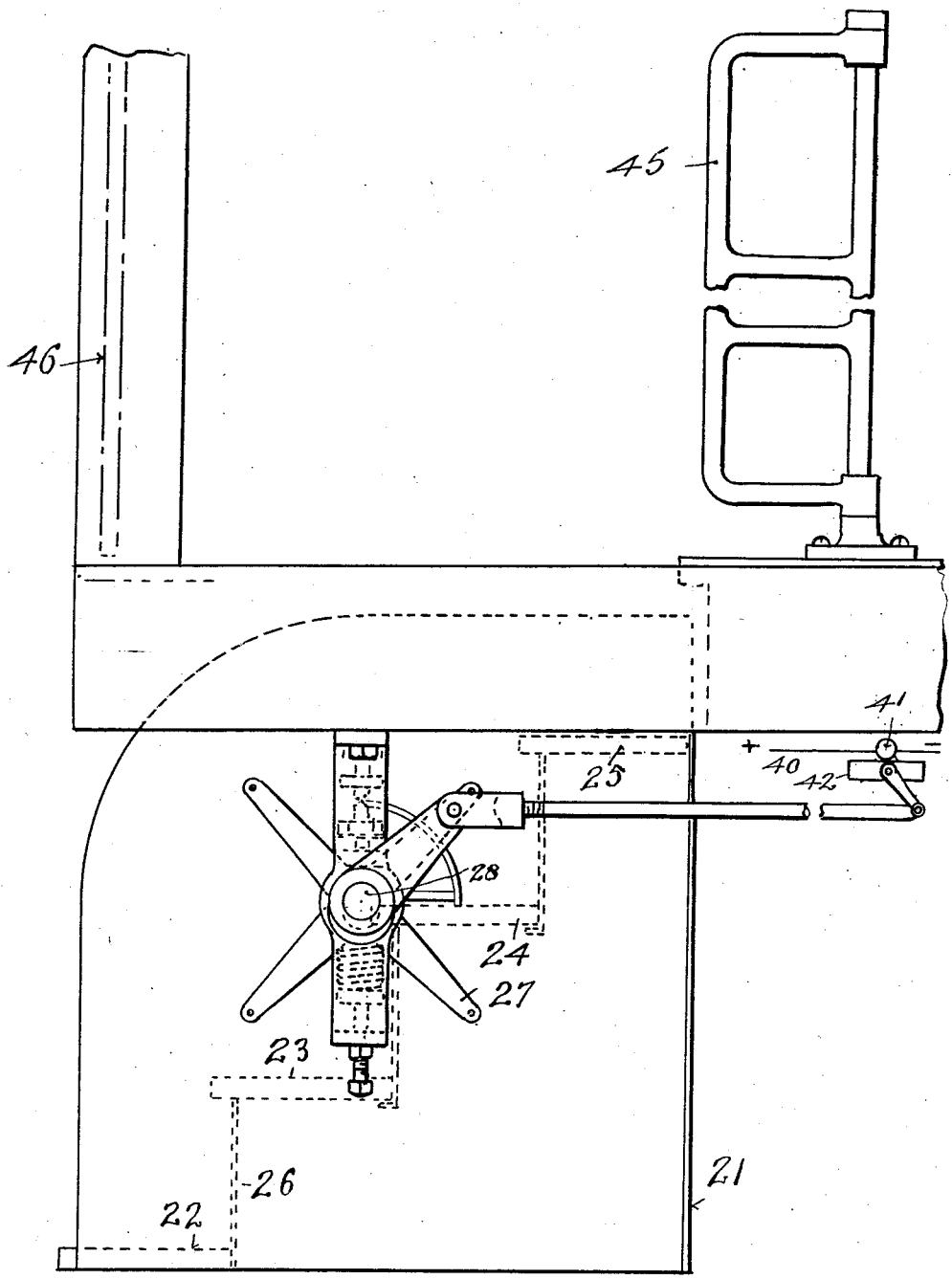
Figure 3:
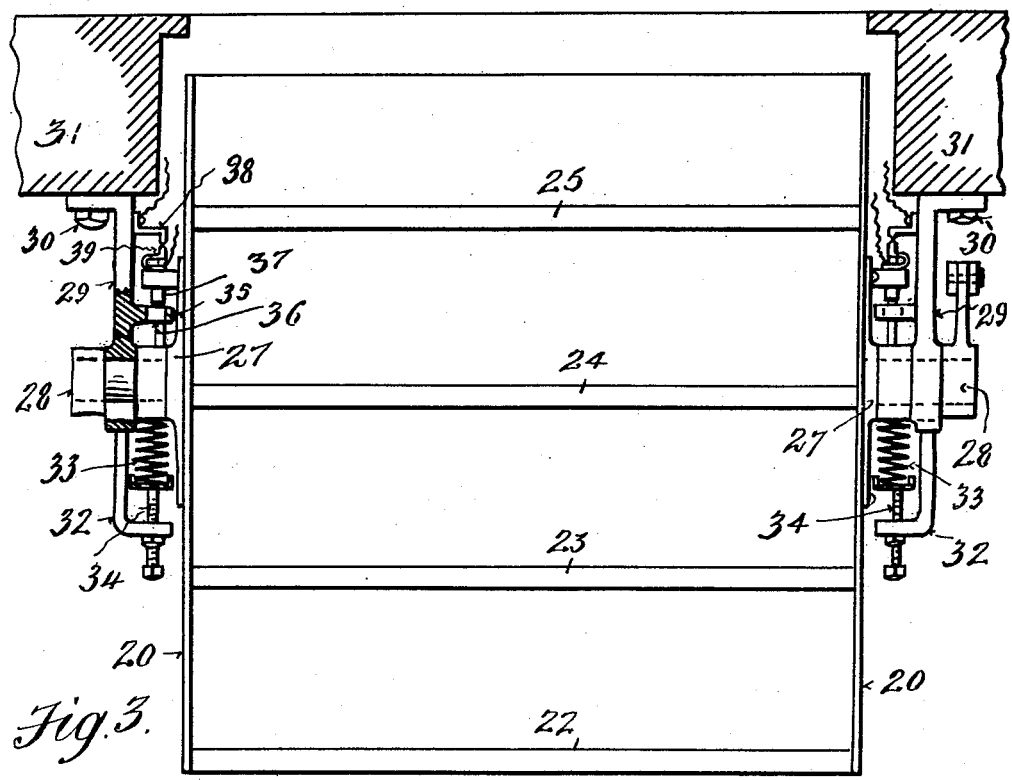
Fig. 3 is a view looking in onto the stairway from a low level platform and showing the stairway in position ready for use with low level platforms or for tilting into trap formation.
Figure 5:
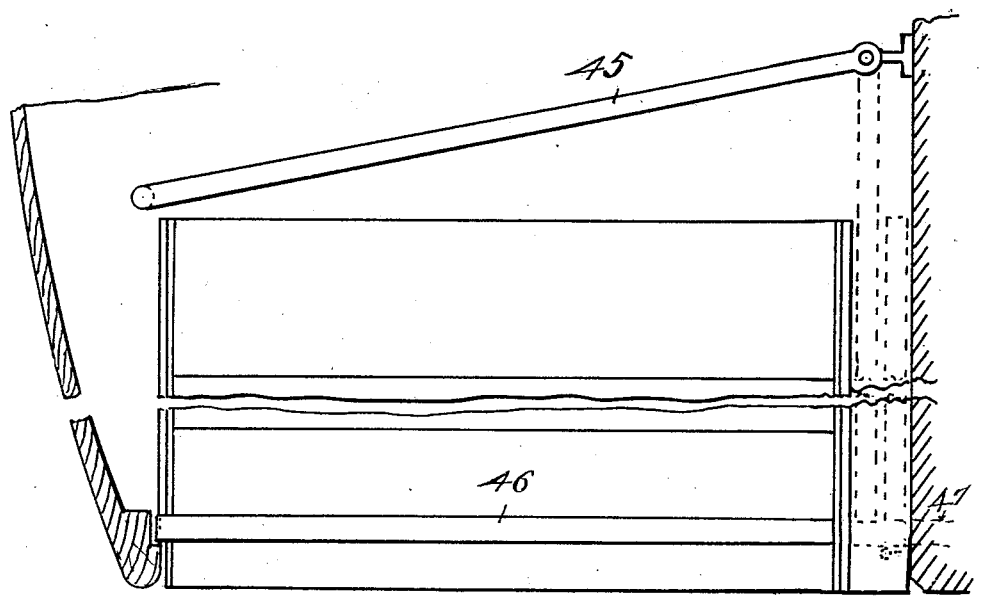
Fig. 5 is a plan view of a portion of the vestibule and stairway.

It is the prime purpose of my invention to provide a combination trap and stairway device by which passengers are protected against accident during the moving of trains, and, further, by which passengers may enter directly from high level or low level platforms. The construction is, moreover, simple and safe and is easily controlled by an operator from a remote point. Moreover, by reason of the construction of my device it is self-cleaning and has the advantage of keeping the steps free from obstructions such as snow or other foreign matter.

Referring now to the drawings wherein I have shown a preferred form of construction by which my invention may be carried out in a practical manner, I provide a boxed housing for the stairway structure having side plates 20, 20, a back plate 21, stair steps 22, 23, 24 and 25 provided with suitable risers 26 all permanently secured together to form a single unit or stairway. On the outside of each of the side plates of the housing there is provided a fixture or bracket 27 having shafts 28 on which the stairway or housing rotates in the supporting bracket 29. These brackets are fastened by suitable means as bolts 30 to the car frame 31. The supporting brackets 29 are provided with extensions 32 for carrying the suspension springs 33. These springs are adjustably held by adjusting means 34 so that the stairway housing is supported to rotate freely for a predetermined weight. Immediately above the rotating shafts 28 extensions 35, 35, on bracket 29, are provided, each of these extensions having an opening 36 for receiving the safety lock pin 37 carried on the stairway bracket 27 in such a position that the weight of a passenger, or passengers, will lower the stairway structure and cause the pin 37 to engage in opening 36 thereby locking the stairway against rotation. It will be noted that electrical contacts 38 and 39 will be separated at this time thereby breaking the electrical circuit 40 and deenergizing the magnetic valve 41 thereby preventing operation of the motor 42, where this type of operating device is used. It will be noted, however, that as soon as the stairway is not occupied by passengers that the spring will tension the structure in operative position. In this position it is possible for an attendant to energize the magnet valve by merely closing one of the control switches 43, or 44, in the circuit. It is understood that by this action the motor will be put into operation and the stairway will be rotated into the desired position, that is, into stair position where it is desired to have passengers leave by low level platforms, or into trap position where it is desired to admit passengers from high level platforms or to discharge passengers to the same.

In order to prevent passengers from crowding onto the trap before a train reaches the station I provide a gate 45 which may be operated by any suitable means (not shown). The usual vestibule door 46 may be provided which is opened into the door slide 47 by known means (not shown). The stairway is rotated through link 48 which is connected with the operating device of selected type; whether this be an electrically controlled motor, pneumatically operated, or mechanically operated is immaterial for the purpose of this invention.

It will be seen from the above disclosure that my device is simple, safe and easily installed on modern railway cars; that it is readily controlled by a single attendant from a point remote without endangering passengers; and that it further provides a solution for high and low level platforms. Other advantages will manifest themselves to those versed in the art and the construction herein disclosed is given by way of example rather than in a limiting sense.

What I claim, therefore, as new and useful and desire to secure by Letters Patent is:

1. A stairway housing comprising stair treads, end plates and a back plate, brackets supported on said end plates, cushioning springs, and means for suspending said stair construction on said cushioning springs.

2. A stairway housing comprising stair treads, end plates and a back plate, brackets supported on said end plates, cushioning springs, means for suspending said construction on said cushioning springs, and means for locking said stair construction in stair forming position.

3. A combined step and trap device for cars, comprising a stair housing having stair treads to form stairs for low level platforms, a back plate to cover said trap for high level platforms, means for rocking said stair housing to cover and uncover said trap, and means actuated by the weight of a passenger for locking said steps in stair position.

4. A combined step and trap device for cars, comprising a stair housing having stair treads to form stairs for low level platforms, a back plate to cover said trap for high level platforms, means for rocking said stair housing to cover and uncover said trap, and means actuated by the weight of a passenger for locking said steps in stair position and a gate to guard said trap.

5. In the construction as described for use on vehicles, the combination comprising a stair housing having stair treads therein to form steps, means for rotatably supporting the housing, power means connected thereto for rotating the housing, electrical control means for controlling the operation of the power means including circuits and a switch in said circuits operable when a person is standing on the steps of the housing to open said circuits so that said control means is out of controlling relation with the power means.

6. The combination with a vehicle, of a step assembly, means for rotatably supporting the step assembly on the vehicle and permitting vertical movement of the step assembly thereon, power means for rotating the step assembly, manual control means including circuits for the power means and a switch in said circuits arranged to be opened upon the vertical movement of the step assembly under the weight of a person to prevent operation of the power means by the manual control means.

7. The combination with a vehicle, of a step assembly, means for rotatably supporting the step assembly on the vehicle and permitting vertical movement of the step assembly thereon, power means for rotating the step assembly, manually control means including circuits for the power means and a switch in said circuits arranged to be opened upon the vertical movement of the step assembly under the weight of a person to prevent operation of the power means by the manual control means, and means for moving the step assembly in the opposite direction when there is no person thereon for closing said switch.

8. The combination with a movable step assembly, of means for rotatably supporting the step assembly, said means permitting a longitudinal movement of the step assembly, a power device for rotating the step assembly to either of two positions, one position permitting the use of the step assembly as steps and the other position as a platform, means for controlling the power device to operate the step assembly, and means controlled by the vertical movement of the step assembly under the weight of a person for preventing the operation of the power device by the means for controlling it.

In testimony whereof I have hereunto set my hand on this 10th day of May, A. D. 1929.

ABRAM FRANK PAUL.